United States Patent
Wang et al.

(10) Patent No.: US 10,393,038 B2
(45) Date of Patent: Aug. 27, 2019

(54) METHOD AND APPARATUS FOR CONTROLLING A TWO-STAGE AIR CHARGING SYSTEM WITH MIXED EGR

(71) Applicant: GM GLOBAL TECHNOLOGY OPERATIONS LLC, Detroit, MI (US)

(72) Inventors: Yue-Yun Wang, Troy, MI (US); Ibrahim Haskara, Troy, MI (US); Giuseppe Conte, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 175 days.

(21) Appl. No.: 15/243,880

(22) Filed: Aug. 22, 2016

(65) Prior Publication Data

US 2018/0051639 A1 Feb. 22, 2018

(51) Int. Cl.

| F02B 37/04 | (2006.01) |
|---|---|
| F02D 41/00 | (2006.01) |
| F02B 37/12 | (2006.01) |
| F02M 26/08 | (2016.01) |
| F02D 41/14 | (2006.01) |

(Continued)

(52) U.S. Cl.
CPC .......... *F02D 41/0007* (2013.01); *F02B 37/04* (2013.01); *F02B 37/12* (2013.01); *F02B 37/24* (2013.01); *F02B 39/10* (2013.01); *F02D 41/005* (2013.01); *F02D 41/0065* (2013.01); *F02D 41/0072* (2013.01); *F02D 41/1401* (2013.01); *F02M 26/05* (2016.02); *F02M 26/06* (2016.02); *F02M 26/08* (2016.02); *F02B 37/16* (2013.01); *F02B 2037/162* (2013.01); *F02D 2041/141* (2013.01); *F02D 2041/142* (2013.01); *F02D 2041/143* (2013.01);

(Continued)

(58) Field of Classification Search
CPC .......... F02B 37/04; F02B 37/16; F02B 37/12; F02B 39/10; Y02T 10/144; F02D 41/0007; F02D 41/005; F02D 41/0065; F02D 41/0072; F02D 41/1401; F02M 26/08
USPC ............... 123/568.19, 568.21; 701/103, 108; 60/605.1, 605.2, 612
See application file for complete search history.

(56) References Cited

U.S. PATENT DOCUMENTS

| 8,209,979 B2 | 7/2012 | Wang |
|---|---|---|
| 9,359,940 B2 * | 6/2016 | Ahrns ..................... F02B 37/14 |

(Continued)

OTHER PUBLICATIONS

U.S. Appl. No. 14/550,673, Ibrahim Haskara.

*Primary Examiner* — Hai H Huynh
*Assistant Examiner* — Gonzalo Laguarda
(74) *Attorney, Agent, or Firm* — Cantor Colburn LLP

(57) ABSTRACT

A two-stage air charging system for an internal combustion engine with mixed exhaust gas recirculation includes a high pressure exhaust gas recirculation loop, a low pressure exhaust gas recirculation loop, an air throttle system, a turbo air charging system, and an electric air charging system. A method to control the system includes monitoring desired operating target commands and operating parameters. Feedback control signals are determined based upon the monitored desired operating target commands and the monitored operating parameters. The two-stage air charging system is controlled based on system control commands for each of the high pressure exhaust gas recirculation loop, the low pressure exhaust gas recirculation loop, the air throttle system, the turbo air charging system and the electric air charging system.

10 Claims, 4 Drawing Sheets

(51) Int. Cl.
    *F02B 39/10*     (2006.01)
    *F02M 26/05*     (2016.01)
    *F02M 26/06*     (2016.01)
    *F02B 37/24*     (2006.01)
    *F02B 37/16*     (2006.01)

(52) U.S. Cl.
    CPC ..... *F02D 2200/0406* (2013.01); *Y02T 10/144* (2013.01); *Y02T 10/47* (2013.01)

(56) References Cited

U.S. PATENT DOCUMENTS

2014/0305413 A1* 10/2014 Ahrns .................... F02B 37/14
                                                                                 123/562
2017/0130658 A1* 5/2017 Makkapati ............. F02B 33/44

* cited by examiner

METHOD AND APPARATUS FOR CONTROLLING A TWO-STAGE AIR CHARGING SYSTEM WITH MIXED EGR

TECHNICAL FIELD

This disclosure is related to control of internal combustion engines.

BACKGROUND

The statements in this section merely provide background information related to the present disclosure. Accordingly, such statements are not intended to constitute an admission of prior art.

Engine control includes control of parameters in the operation of an engine based upon a desired engine output, including an engine speed and an engine load, and resulting operation, for example, including engine emissions. Parameters controlled by engine control methods include air flow, fuel flow, and intake and exhaust valve settings.

Boost air can be provided to an engine to provide an increased flow of air to the engine relative to a naturally aspirated intake system to increase the output of the engine. An air charging system such as a turbocharging system utilizes pressure in an exhaust system of the engine to drive a compressor providing boost air to the engine. Exemplary turbochargers can include variable geometry turbochargers (VGT), enabling modulation of boost air provided for given conditions in the exhaust system. A supercharger utilizes mechanical power from the engine, for example as provided by an accessory belt, to drive a compressor providing boost air to the engine. Engine control methods control boost air in order to control the resulting combustion within the engine and the resulting output of the engine.

Exemplary engines may utilize two-stage air charging or boosting wherein a secondary air charger is utilized to increase air flow to the engine. The secondary air charger may be an electric powered air charger or e-boost. Methods of controlling an engine having two-stage boosting varies from the control methods of a single-stage boosted engine. The control may be achieved using unique model based control of the electric air charging system.

Exhaust gas recirculation (EGR) is another parameter that can be controlled by engine control methods. An exhaust gas flow within the exhaust system of an engine is depleted of oxygen and is essentially an inert gas. When introduced to or retained within a combustion chamber in combination with a combustion charge of fuel and air, the exhaust gas moderates the combustion, reducing an output and an adiabatic flame temperature. EGR can also be controlled in combination with other parameters in advanced combustion strategies, for example, including homogeneous charge compression ignition (HCCI) combustion. EGR can also be controlled to change properties of the resulting exhaust gas flow. Engine control methods control EGR in order to control the resulting combustion within the engine and the resulting output of the engine. EGR system circuits can include multiple routes of providing exhaust gas into the combustion chamber including high pressure exhaust gas recirculation circuits and low pressure exhaust gas recirculation circuits. In boosted engines, exhaust gas may be directed into the engine intake manifold via a high pressure route wherein the exhaust gas is directed back into the intake flow prior to flowing through the VGT such that the exhaust gas remains pressurized. The exhaust gas may additionally be directed back to the engine intake manifold through a circuit after passing through the VGT, at which point the exhaust gas is no longer under pressure.

Air handling systems for an engine manage the flow of intake air and EGR into the engine. Air handling systems must be equipped to meet charge air composition targets (e.g. an EGR fraction target) to achieve emissions targets, and meet total air available targets (e.g. the charge flow mass flow) to achieve desired power and torque targets. The actuators that most strongly affect EGR flow generally affect charge flow, and the actuators that most strongly affect charge flow generally affect EGR flow. Therefore, an engine with a modern air handling system presents a multiple input multiple output (MIMO) system with coupled input-output response loops.

MIMO systems, where the inputs are coupled, i.e. the input-output response loops affect each other, present well known challenges in the art. An engine air handling system presents further challenges. The engine operates over a wide range of parameters including variable engine speeds, variable torque outputs, and variable fueling and timing schedules. In many cases, exact transfer functions for the system are unavailable and/or the computing power needed for a standard decoupling calculation is not available. Multi-route EGR operation allows the system to run higher EGR rates at higher boost levels, but affects the VGT/compressor flow and power which impacts boost control design and performance.

SUMMARY

A two-stage air charging system for an internal combustion engine with mixed exhaust gas recirculation includes a high pressure exhaust gas recirculation loop, a low pressure exhaust gas recirculation loop, an air throttle system, a turbo air charging system, and an electric air charging system. A method to control the system includes monitoring desired operating target commands and operating parameters. Feedback control signals are determined based upon the monitored desired operating target commands and the monitored operating parameters. The two-stage air charging system is controlled based on system control commands for each of the high pressure exhaust gas recirculation loop, the low pressure exhaust gas recirculation loop, the air throttle system, the turbo air charging system and the electric air charging system.

BRIEF DESCRIPTION OF THE DRAWINGS

One or more embodiments will now be described, by way of example, with reference to the accompanying drawings, in which.

DETAILED DESCRIPTION

Figure 1:
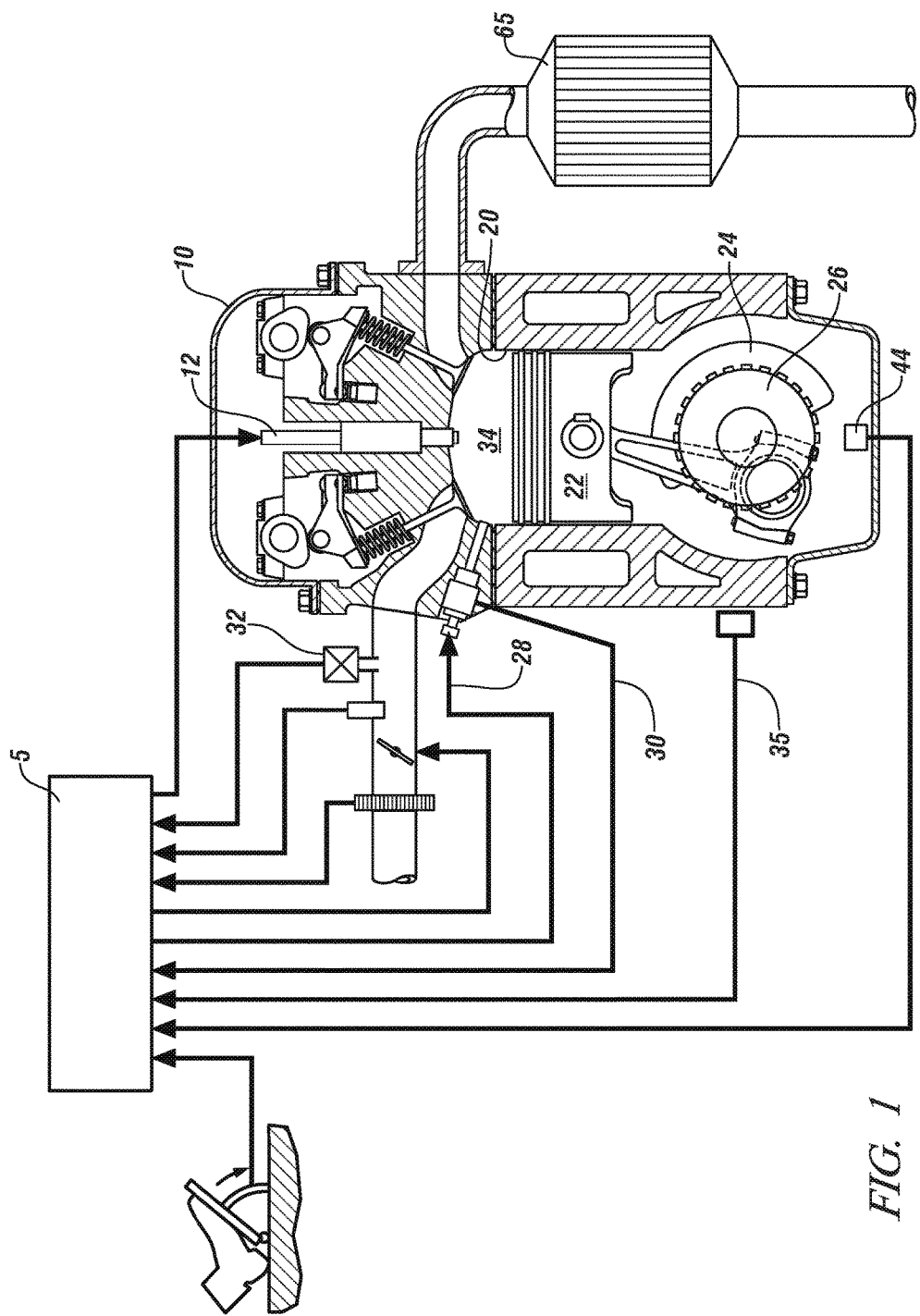
FIG. 1 schematically depicts an exemplary internal combustion engine, control module, and exhaust aftertreatment system, in accordance with the present disclosure.

Referring now to the drawings, wherein the showings are for the purpose of illustrating certain exemplary embodiments only and not for the purpose of limiting the same, FIG. 1 schematically depicts an exemplary internal combustion engine 10, control module 5, and exhaust aftertreatment system 65, in accordance with the present disclosure. The exemplary engine includes a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request, $T_{O\_REQ}$. The engine preferably employs a four-stroke operation wherein each engine combustion cycle includes 720 degrees of angular rotation of crankshaft 24 divided into four 180-degree stages (intake-compression-expansion-exhaust), which are descriptive of reciprocating movement of the piston 22 in the engine cylinder 20. A multi-tooth target wheel 26 is attached to the crankshaft and rotates therewith. The engine includes sensors to monitor engine operation, and actuators which control engine operation. The sensors and actuators are signally or operatively connected to control module 5.

The engine is preferably a direct-injection, four-stroke, internal combustion engine including a variable volume combustion chamber defined by the piston reciprocating within the cylinder between top-dead-center and bottom-dead-center points and a cylinder head including an intake valve and an exhaust valve. The piston reciprocates in repetitive cycles each cycle including intake, compression, expansion, and exhaust strokes.

The engine preferably has an air/fuel operating regime that is primarily lean of stoichiometry. One having ordinary skill in the art understands that aspects of the disclosure are applicable to other engine configurations that operate either at stoichiometry or primarily lean of stoichiometry, e.g., lean-burn spark-ignition engines or the conventional gasoline engines. During normal operation of the compression-ignition engine, a combustion event occurs during each engine cycle when a fuel charge is injected into the combustion chamber to form, with the intake air and recirculated exhaust gas, the cylinder charge. The charge is subsequently combusted by action of compression thereof during the compression stroke.

The engine is adapted to operate over a broad range of temperatures, cylinder charge (air, fuel, and EGR) and injection events. The methods disclosed herein are particularly suited to operation with direct-injection compression-ignition engines operating lean of stoichiometry to determine parameters which correlate to heat release in each of the combustion chambers during ongoing operation. The methods are further applicable to other engine configurations and their subsystems, including spark-ignition engines, including those adapted to use homogeneous charge compression ignition (HCCI) strategies. The methods are applicable to systems utilizing multi-pulse fuel injection events per cylinder per engine cycle, e.g., a system employing a pilot injection for fuel reforming, a main injection event for engine power, and where applicable, a post-combustion fuel injection event for aftertreatment management, each which affects cylinder pressure.

Sensors are installed on or near the engine to monitor physical characteristics and generate signals which are correlatable to engine and ambient parameters. The sensors include a crankshaft rotation sensor, including a crank sensor 44 for monitoring crankshaft (i.e. engine) speed (RPM) through sensing edges on the teeth of the multi-tooth target wheel 26. The crank sensor is known, and may include, e.g., a Hall-effect sensor, an inductive sensor, or a magnetoresistive sensor. Signal output from the crank sensor 44 is input to the control module 5. A combustion pressure sensor 30 is adapted to monitor in-cylinder pressure (COMB_PR). The combustion pressure sensor 30 is preferably non-intrusive and includes a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the pressure sensor 30. The output signal, COMB_PR, of the pressure sensor 30 is proportional to cylinder pressure. The pressure sensor 30 includes a piezoceramic or other device adaptable as such. Other sensors preferably include a manifold pressure sensor for monitoring manifold pressure (MAP) and ambient barometric pressure (BARO), a mass air flow sensor for monitoring intake mass air flow (MAF) and intake air temperature ($T_{IN}$), and a coolant sensor 35 monitoring engine coolant temperature (COOLANT). The system may include an exhaust gas sensor for monitoring states of one or more exhaust gas parameters, e.g., temperature, air/fuel ratio, and constituents. One having ordinary skill in the art understands that there may be other sensors and methods for purposes of control and diagnostics. The operator input, in the form of the operator torque request, $T_{O\_REQ}$, is typically obtained through a throttle pedal and a brake pedal, among other devices. The engine is preferably equipped with other sensors for monitoring operation and for purposes of system control. Each of the sensors is signally connected to the control module 5 to provide signal information which is transformed by the control module to information representative of the respective monitored parameter. It is understood that this configuration is illustrative, not restrictive, including the various sensors being replaceable with functionally equivalent devices and routines.

The actuators are installed on the engine and controlled by the control module 5 in response to operator inputs to achieve various performance goals. Actuators include an electronically-controlled throttle valve which controls throttle opening in response to a control signal (ETC), and a plurality of fuel injectors 12 for directly injecting fuel into each of the combustion chambers in response to a control signal (INJ_PW), all of which are controlled in response to the operator torque request, $T_{O\_REQ}$. An exhaust gas recirculation valve 32 and cooler control flow of externally recirculated exhaust gas to the engine intake, in response to a control signal (EGR) from the control module. A glow-plug 28 is installed in each of the combustion chambers and adapted for use with the combustion pressure sensor 30. Additionally, a charging system can be employed in some embodiments supplying boost air according to a desired manifold air pressure.

Fuel injector 12 is a high-pressure fuel injector adapted to directly inject a fuel charge into one of the combustion chambers in response to the command signal, INJ_PW, from the control module. Each of the fuel injectors 12 is supplied pressurized fuel from a fuel distribution system, and has operating characteristics including a minimum pulsewidth and an associated minimum fuel flow rate, and a maximum fuel flow rate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 executes routines stored therein to control the aforementioned actuators to control engine operation, including throttle position, fuel injection mass and timing, exhaust gas recirculation (EGR) valve position to control flow of recirculated exhaust gases, glow-plug operation, and control of intake and/or exhaust valve timing, phasing, and lift on systems so equipped. The control module is configured to receive input signals from the operator (e.g., a throttle pedal position and a brake pedal position) to determine the operator torque request, $T_{O\_REQ}$, and from the sensors indicating the engine speed (RPM) and intake air temperature (Tin), and coolant temperature and other ambient conditions.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the desired functionality. The control module has a set of control routines, including resident software program instructions and calibrations stored in memory and executed to provide the desired functions. The routines are preferably executed during preset loop cycles. Routines are executed, such as by a central processing unit, and are operable to monitor inputs from sensors and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, routines may be executed in response to occurrence of an event.

FIG. 1 depicts an exemplary diesel engine, however, the present disclosure can be utilized on other engine configurations, for example, including gasoline-fueled engines, ethanol or E85 fueled engines, or other similar known designs. The disclosure is not intended to be limited to the particular exemplary embodiments disclosed herein.

Figure 2:
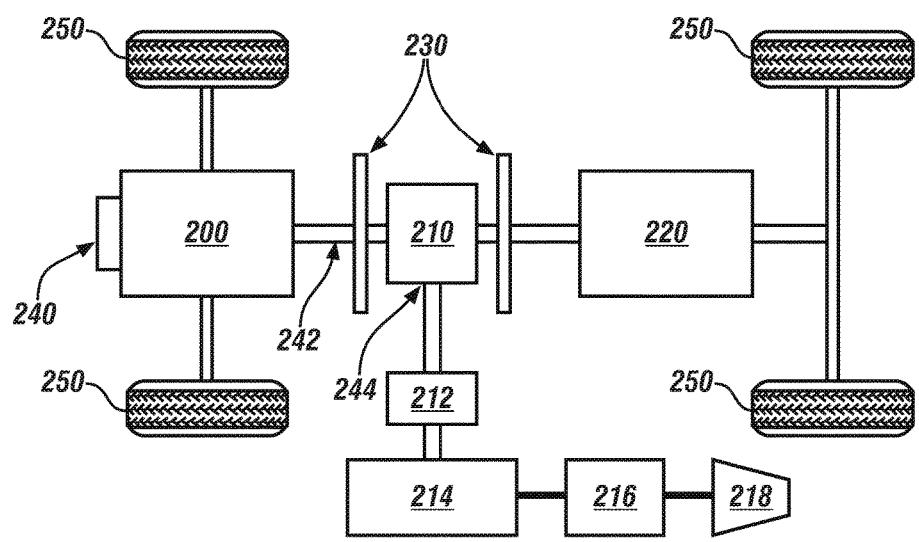
FIG. 2 schematically depicts an exemplary hybrid vehicle configuration including an engine, an electric torque machine and a compressor, in accordance with the present disclosure.

FIG. 2 schematically depicts an exemplary hybrid vehicle configuration for a vehicle having electrical charging or boost. The exemplary hybrid vehicle configuration includes an engine 200 and an electric torque machine 210. The electric torque machine may be a motor generator unit (MGU). The MGU may operate as a motor to assist in accelerating the vehicle. The MGU may also operate as a generator. When operating as a generator the MGU may recuperate energy during braking. Clutches 230 may detach the engine 200 from the transmission 220 allowing vehicle cruising without firing the engine to achieve fuel saving. The MGU is connected to an inverter 212 which is connected to battery 214. In an exemplary embodiment the battery 214 may be a 48-volt battery. The MGU may draw electrical power from battery 214 through inverter 212 when operating as a motor or may alternatively provide power to battery 214 through inverter 212 when operating as a generator. In the exemplary embodiment the MGU is located in position 244 between clutches 230. The MGU may be alternatively be located in position 240 as a belt alternator starter or in position 242 between an engine flywheel and the transmission 220. The hybrid vehicle configuration further includes a second motor 216 which draws electrical power from battery 214. Alternatively, the second motor 216 may draw electrical power from a source not configured to power the MGU and having any voltage. The electrical charging is generated by electrical compressor 218 which is driven by the second motor 216.

Figure 3:
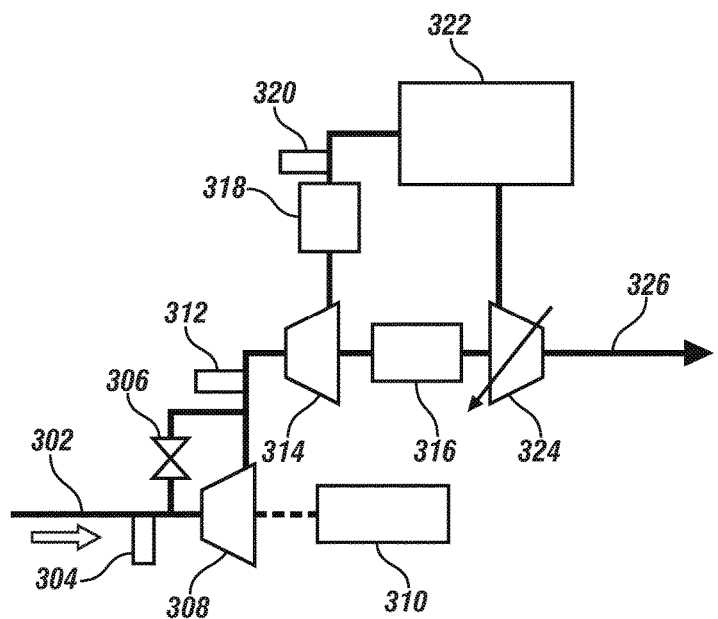
FIG. 3 schematically depicts an exemplary architecture for a diesel engine having a two-stage air charging system with turbo and electrical air charging, in accordance with the present disclosure.

FIG. 3 schematically depicts an exemplary architecture for a diesel engine having a two-stage charging system with turbo and electrical air charging. In this FIG. 3 there is shown an air inlet conduit 302 through which ambient air passes on its way to one or more engine cylinders. There is also an exhaust gas conduit 326 through which exhaust gases from the combustion engine 322 are expelled during its normal operation. In this embodiment, a first compressor 308 is provided to compress the inlet air to increase its density to provide a higher concentration of oxygen in the air feed to the engine. The first compressor is depicted as being an electrically driven charging system which draws power from battery 310. Such configurations are referred to herein as electrical air charging.

A second compressor 314 is provided downstream of the first compressor 308, to further compress the inlet air to increase its density to provide a higher concentration of oxygen in the air fed to the engine. The second compressor 314 is depicted as being part of an exhaust gas driven charging system 316 and may be shaft-driven by a first turbine 324, which may be a variable-geometry turbine (VGT) that is disposed in the exhaust gas conduit, as is known in the art of turbocharging. Such configurations are referred to herein as turbo air charging. There may be a VGT geometry sensor in effective sensing contact with first turbine 324 when same is a variable-geometry turbine, for providing real-time information concerning the geometry of the VGT. An intercooler 318 may be included downstream of the second compressor 314 of the turbo air charging system 316 to cool the compressed air prior entering an engine air intake. The intercooler 318 is preferably provided on the high-pressure side of second compressor 314, when present, to dissipate some of the heat resulting from compression of the inlet air. There is also a by-pass valve 306 positioned to allow intake air to bypass the first compressor 308 and having a position sensor disposed in effective proximity to sense the position of the by-pass valve 306. In one exemplary embodiment, recirculation of exhaust gases (EGR) may be effected by means of a selectively-actuable valve disposed in a conduit provided between the air inlet conduit 302 and the exhaust gas conduit 326. Such embodiments may include a to reduce the temperature of the re-circulated exhaust gases prior to mixing with air being admitted through the air inlet conduit 302, and an EGR valve position sensor. In preferred embodiments an aftertreatment system is disposed between an exhaust manifold of the engine and the point on the exhaust gas conduit 326 at which exhaust gases are released to the atmosphere. In some embodiments, a $\Delta p$ sensor is present for providing the difference in pressure of the exhaust gases before and after the aftertreatment system. In one embodiment, the aftertreatment system includes oxidation and reduction catalysts and a particulate filter.

Operation of the engine 322, positioned between the second compressor 314 and the turbine 324, may be beneficially controlled by providing sensors 304, 312 and 320 at the depicted general locations along the air inlet conduit 302 shown in FIG. 3. Suitable as sensors 312 and 320 include without limitation such sensors as air inlet pressure and temperature sensors, which are useful to measure intake manifold temperature and pressure at the inlet to the second compressor 314 and downstream of the second compressor 314 prior to entering an engine air intake manifold. Suitable as sensors 304 include without limitation such sensors as mass airflow rate sensors, ambient air temperature sensors, and ambient air pressure sensors. Sensors 304 may additionally include motor speed sensors for determining the speed of the first compressor 308. In preferred embodiments, the various sensors provide inputs to at least one control module operatively connected to various devices useful for controlling combustion and engine operation, including without limitation compressor boost pressure, exhaust gas recirculation, exhaust gas pressure, the aspect ratio of a turbo charger when present, and in some cases, valve timing.

During one mode of operation of a combustion engine the various sensors 304, 312 and 320 have outputs which are provided as inputs to at least one control module. This enables control of the operation and position of by-pass valve 306 and the effective aspect ratio of turbine 324. According to one embodiment of this disclosure, a model-based approach is used to effectively control boost pressure of the first compressor 308 and the second compressor 314 by modulating the position of the by-pass valve 306 and the geometry of the variable-geometry turbine 324 as well as controlling the motor driving the electrically driven first compressor 308. This model-based control for a two-stage boosting architecture including turbo and electrical boosting, such as the architecture shown in FIG. 3, allows significant engine downsizing for engines having two, three or four cylinders. The model-based control further provides for fast torque acceleration without turbo lag and may provide some $CO_2$ benefits. Model-based control of the electrical charger, including the first compressor 308, reduces the need for vehicle calibrations.

The configuration of the two-stage charging system described above with reference to FIG. 3 incldes a first air charging system being an electrical air charging system positioned upstream of a second air charging system being a turbo air charging system. In an alternate embodiment the first air charging system may be a turbo air charging system positioned upstream of a second air charging system being an electrical air charging system. The engine depicted in this exemplary embodiment is a diesel engine. In an alternate embodiment the engine may be a gasoline internal combustion engine.

It is appreciated by one having ordinary skill in the art that while the various components described above with reference to FIG. 3 are depicted in schematic view, that many of the elements described, including the air inlet conduit and exhaust gas conduit, may be provided by integral castings, such as intake and exhaust manifolds which comprise one or more of such components, to the extent that such configurations are generally known in the art. In one embodiment, the engine is a compression-ignition engine, operating using diesel fractions, oils, or esters such as "biodiesel" as fuel. In another embodiment, the engine is a spark-ignition engine, operated using gasoline, ethanol, mixtures thereof, or other normally-liquid hydrocarbons and oxygenates as fuel.

Figure 4:
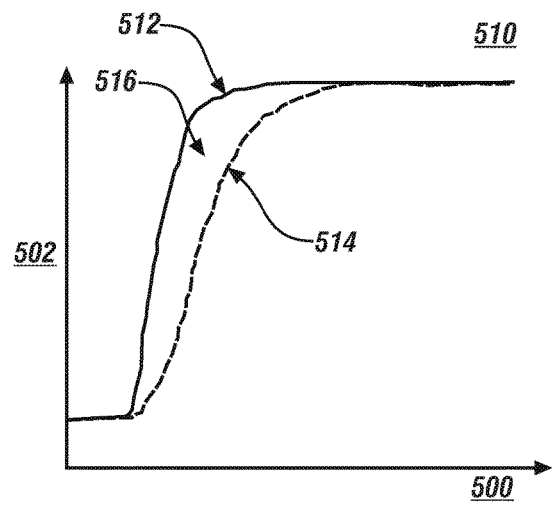
FIG. 4 graphically depicts an exemplary power split of a two-stage air charging system having turbo and electrical air charging, in accordance with the present disclosure.

FIG. 4 graphically depicts an exemplary power split of a two-stage boosted system having turbo and electrical air charging. The figure graphically represents a model based power split method to control a two-stage boosting system including turbo and electrical air charging systems. In an exemplary architecture having an electrically powered compressor as well as a turbo air charging system including a second compressor a pressure ratio across the electrical charging system $p_{re}$ may be determined based on sensor feedback from upstream and downstream of the compressor of the electrical charging system. A pressure ratio across the turbo air charging system $p_{re}$ may also be determined based on sensor feedback from upstream and downstream of the compressor of the turbo air charging system. Plot 410 depicts pressure ratio along the vertical axis 402 over time along the horizontal axis 400. A total desired pressure ratio 412 across both the turbo and electrical air charging systems $p_{r\_des}$ is depicted. 414 depicts a desired pressure ratio across the turbo air charging system $p_{rc\_des}$. Accordingly, the difference 416 between the desired pressure ratio across the turbo air charging system 414 and the total desired pressure ratio 412 is the desired pressure ratio 416 across the electrical charging system $p_{re\_des}$.

The total desired pressure ratio $p_{r\_des}$ 412 may be expressed by the following relationship:

$$p_{r\_des} = \frac{p_{i\_des}}{p_a} = p_{rc\_des} \times p_{re\_des} = \frac{p_{i\_des}}{p_{c\_ds\_des}} \times \frac{p_{c\_ds\_des}}{p_a} \quad [1]$$

wherein $p_{r_{des}}$ is a total pressure ratio across both stages of the two stage air boosting system;

$p_{i_{des}}$ is a desired intake pressure at an engine intake manifold of the internal combustion engine;

$p_a$ is an ambient pressure;

$p_{re_{des}}$ is a desired pressure ratio across the first stage of the two-stage air boosting system;

$p_{rc_{des}}$ is a desired pressure ratio across the second stage of the two-stage air boosting system; and $p_{c_{ds_{des}}}$ is a desired pressure downstream of the second stage of the two-stage air boosting system.

Figure 5:
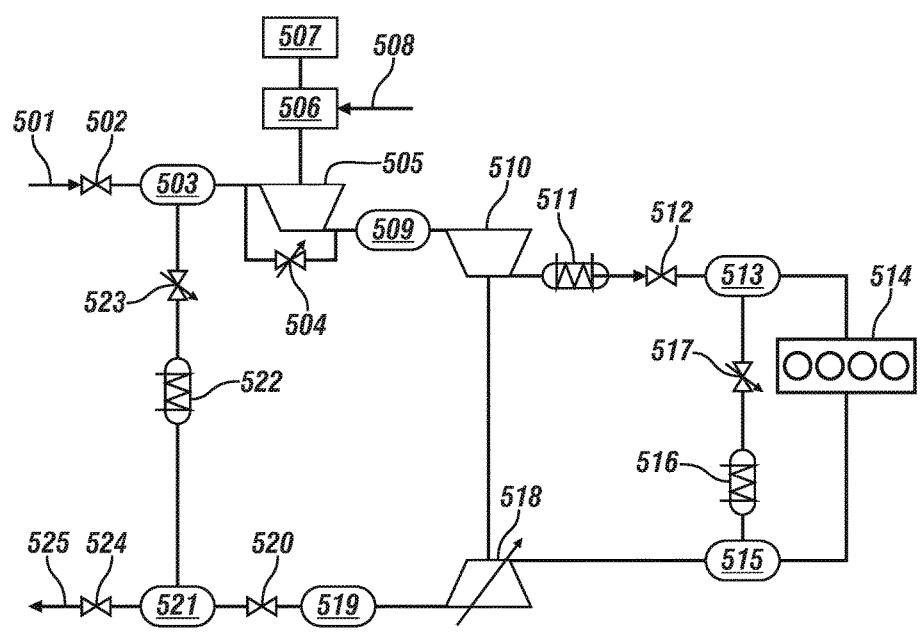
FIG. 5 schematically depicts an exemplary engine configuration including a two-stage air charging system with turbo and electrical air charging, and a multi-route exhaust gas recirculation system, in accordance with the present disclosure.

FIG. 5 schematically depicts an exemplary engine configuration including a two-stage air charging system, and a multi-route exhaust gas recirculation system, in accordance with the present disclosure. The exemplary engine is multi-cylinder and includes a variety of fueling types and combustion strategies known in the art. Air intake flow 501, which is at an ambient pressure $p_{amb}$ passes through intake air filter 502 to flow point $p_1$ 503. At flow point 503 the intake air flow 501 mixes with the low pressure EGR flow which is controlled by LP EGR valve 523. The combined flows may then pass through the first air charging system including electrical compressor 505. The burned gas fraction at the intake of electrical compressor 505 may be denoted as $F_i$. The electrical compressor 505 is driven by electrical motor 506 which is powered by power source 507. Power source 507 may be a battery, including a hybrid battery, or any other known power sources. The electrical motor 506 is controlled based upon a electrical compressor torque command $T_{ec}$ 508. The electrical compressor torque command 508 may be provided by a control module. A portion or all of the combined flows from flow point 503 may be diverted around electrical compressor 505 through a bypass valve 504. The intake flow through the electrical compressor 505 will have a measurable air mass flow $\dot{m}_{ec}$. The intake air flow then proceeds to the second air charging system which is depicted as a turbocharger including compressor 510 being driven by turbine 518. At flow point 509 the pressure of the flow through the first air charging system including electrical compressor 505 is equivalent to the pressure of the flow at the intake of the turbo air charging system and may be expressed as $p_{ic}$. The intake flow through the compressor 510 will have a measurable air mass flow $\dot{m}_{c}$.

The system further includes a charge air cooler 511 which cools intake air flow, intake throttle 512, intake manifold 513, a high-pressure EGR valve 517 and cooler 516, exhaust manifold 515, a diesel oxidation catalyst (DOC) and diesel particulate filter (DPF) 520, a low-pressure EGR cooler 522, and a low-pressure EGR valve 523.

The burned gas fraction at charge air cooler 511 may be denoted as $F_c$. At intake manifold 513 the intake air parameters may be expressed as having a pressure $p_{IM}$, a temperature $T_{IM}$, and a burned gas fraction $F_I$. At exhaust manifold 515 the exhaust gas flow may be expressed having a pressure $p_{EM}$ and a temperature $T_{EM}$. The exhaust gas flow pressure may further be monitored at points 519 and 521 using pressure sensors.

Ambient intake air is drawn into the first compressor 505, and then into the second compressor 510 through intake 501. Pressurized intake air and EGR flow are delivered to intake manifold 513 for use in engine 514. Exhaust gas flow exits engine 514 through exhaust manifold 515, drives turbine 518, and exits through exhaust tube 525. The depicted EGR system includes a high pressure EGR system, delivering pressurized exhaust gas from exhaust manifold 515 to intake manifold 513. The high pressure EGR system is controlled using high pressure EGR valve 517. The depicted EGR system additionally includes, a low pressure EGR system, delivering low pressure exhaust gas from exhaust tube 525 to intake 501. The low pressure EGR system is controlled using low pressure EGR valve 523. Sensors are installed on the engine to monitor physical characteristics and generate signals which are correlatable to engine and ambient parameters. The sensors preferably include an ambient air pressure sensor, an ambient or intake air temperature sensor, and a mass air flow sensor (all which can be configured individually or as a single integrated device), an intake manifold air temperature sensor, a MAP sensor, an exhaust gas temperature sensor, an air throttle valve position sensor and a high-pressure EGR valve position sensor, a turbine vane position sensor, as well as low-pressure EGR throttle valve position sensors, and a low-pressure EGR valve position sensor. An engine speed sensor monitors rotational speed of the engine. Each of the sensors is signally connected to a control module to provide signal information which is transformed by the control module to information representative of the respective monitored parameter. It is understood that this configuration is illustrative, not restrictive, including the various sensors being replaceable within functionally equivalent devices and algorithms and still fall within the scope of the disclosure. Furthermore, the intake air compressor may include alternative turbocharger configurations within the scope of this disclosure.

In the exemplary embodiment the second intake air compressor, positioned downstream of the first intake air compressor 505, includes a turbocharger including an air compressor 510 positioned in the air intake of the engine which is driven by turbine 518 that is positioned in the exhaust gas flowstream. Turbine 518 can include a number of embodiments, including a device with fixed vane orientations or variable vane orientations. Further, a turbocharger can be used as a single device, or multiple turbochargers can be used to supply boost air to the same engine. The first intake air compressor 505 is an electrical air charging system. In an alternate embodiment the first intake air compressor may include a turbocharger including an air compressor positioned in the air intake of the engine which is driven by a turbine that is positioned in the exhaust gas flowstream. In this alternate embodiment the second air intake compressor may comprise an electrical air charging system.

The turbocharger including turbine 518 may comprise a variable geometry turbocharger. Variable geometry turbochargers (VGT) enable control of how much compression is performed on intake air. A control signal can modulate operation of the VGT, for example, by modulating an angle of the vanes in the compressor and/or turbine. Such exemplary modulation can decrease the angle of such vanes, decreasing compression of the intake air, or increase the angle of such vanes, increasing compression of the intake air. VGT systems allow a control module to select a level of boost pressure delivered to the engine. Other methods of controlling a variable charger output, for example, including a waste gate or a bypass valve, can be implemented similarly to a VGT system, and the disclosure is not intended to be limited to the particular exemplary embodiments disclosed herein for controlling boost pressure delivered to the engine.

Exemplary diesel engines are equipped with common rail fuel-injection systems, EGR systems, and VGT systems. Exhaust gas recirculation is used to controllably decrease combustion flaming temperature and reduce NOx emissions. VGT systems are utilized to modulate boost pressures to control a manifold air pressure and increase engine output. To accomplish engine control including control of the EGR and VGT systems, a multi-input multi-output air charging control module (MIMO module) can be utilized. A MIMO module enables computationally efficient and coordinated control of EGR and VGT based upon a single set of inputs describing desired engine operation. Such input, for example, can include an operating point for the engine describing an engine speed and an engine load. It will be appreciated that other parameters can be utilized as input, for example, including pressure measurements indicating an engine load.

Coupled MIMO control of both EGR and VGT, or control fixing response of both EGR and VGT based upon any given input, is computationally efficient and can enable complex control responses to changing inputs that might not be computationally possible in real-time based upon independent control of EGR and VGT. However, coupled control of EGR and VGT, including fixed responses of both parameters for any given input, requires simplified or best fit calibrations of the coupled controls in order to control both fixed responses. As a result, such calibrations can be challenging and can include less than optimal engine performance based upon the simplified control calibrations selected. EGR and VGT, for example, might optimally react differently to a rate of change in load or to engine temperatures. Additionally, control of EGR or VGT can reach limit conditions and result in actuator saturation. Coupled control resulting in actuator saturation can cause a condition known in the art as wind-up wherein expected behavior of the system and desired control of the system diverge and result in control errors even after the actuator saturation has been resolved. Additionally, control of EGR and VGT by a MIMO module is nonlinear, and defining the coupled functional relationships to provide the desired control outputs requires extensive calibration work.

VGT commands are one way to control boost pressure. However, other commands controlling a boost pressure such as a boost pressure command or a manifold air pressure command can be utilized similarly in place of VGT commands.

The engine configuration, such as the exemplary engine configuration, including a first air charging system including an electrically driven compressor and a second air charging system including a turbocharging system, as is schematically depicted in FIG. 5 may be represented by a mathematical model. Model-based nonlinear control may be applied to transform desired air and charging targets to individual flow or power for each actuator, such as exhaust gas recirculation flow, intake air flow, and turbine power. An actuator position for each of the high pressure EGR valve, low pressure EGR valve, air throttle valve, and the VGT control can be uniquely determined based on the individual flow or power values, additionally resulting in a decoupled and nearly linearized system for feedback control. A method to control an engine including mixed EGR, air throttle and air charging control includes utilizing physics model-based feedforward control, or feedback linearization control to decouple the controls of a multivariable system.

With a two-stage boosted engine configuration that includes multi-route EGR loops the system may operate running higher EGR rates at higher boost levels, however this affects the turbine and compressor flow and power which impacts boost control design and performance. By utilizing a physical model-based air charging control algorithm, the model-based controls can modulate air charging actuators to minimize the impact of varying high-pressure/low-pressure EGR rates on the boosting system. Based on a two-stage air charging system energy balance model the desired boost may be maintained by adapting the VGT position to different combinations of HP and LP EGR for a given desired overall in-cylinder EGR rate. Unlike boost control methods that utilize look-up tables as feedforward control without taking into account the EGR operation and calibration, model based controls eliminate boost control recalibration against any changes of the mix between high-pressure and low-pressure EGR loops. This reduces couplings/interactions between the boost system and the multiple EGR loops. Model-based feedforward boost control additionally enhances robustness against system variations and environmental changes such as ambient temperature and pressure; reduces feedback control calibration and improves transient responses via model-based feedforward control.

In accordance with the exemplary engine configuration depicted in FIG. 5, the various LP, HP, and combined EGR rates of the system air and EGR flows may be expressed by a series of relationships. The long-route EGR mixing point is the point where the LP EGR flow $W_{egr,LP}$ passes through LP EGR valve 523 and mixes with the fresh air flow $W_{air}$ as it passes through a LP EGR throttle valve. Low pressure EGR rate $r_{LP}$ at the long-route EGR mixing point 503 may be expressed by the following relationship.

$$r_{LP} = \frac{W_{egr,LP}}{W_{air} + W_{egr,LP}} \quad [2]$$

The short-route EGR mixing point is the point where the HP EGR flow $W_{egr,HP}$ passes through HP EGR valve 517 and mixes with the compressor flow $W_c$ as it passes through an intake throttle valve 512. High pressure EGR rate $r_{HP}$ at the short-route EGR mixing point may be expressed by the following relationship.

$$r_{HP} = \frac{W_{egr,HP}}{W_c + W_{egr,HP}} \quad [3]$$

The in-cylinder EGR rate r in the cylinder charge flow $W_{cyl}$ may be expressed by the following relationships.

$$r = \frac{W_{egr,HP} + W_{egr,LP}}{W_{cyl}} \quad [4]$$

$$r = r_{HP} + (1 - r_{HP}) * r_{LP} \quad [5]$$

The split EGR ratio may then be expressed by the following relationship.

$$r_{SP} = \frac{W_{egr,LP}}{W_{egr,LP} + W_{egr,HP}} = 1 - \frac{r_{HP}}{r} \quad [6]$$

When the system is operating at steady-state, the system flows, including the cylinder charge flow $W_{cyl}$, the flow out of the turbine 518 $W_t$, and the flow into the compressor $W_c$, may be expressed by the following relationships.

$$W_{cyl} = \eta_v \frac{V_d}{12CR * T_i} P_i * N \quad [7]$$

wherein N is engine speed
$V_d$ is engine displacement volume,
$P_i$ is the intake pressure,
R is the universal gas constant,
$\eta_v$ is the engine volumetric efficiency, and
$T_i$ is the intake temperature.

$$W_t = (1 - r_{HP}) * W_{cyl} + W_f \quad [8]$$

$$W_c = (1 - r_{HP}) * W_{cyl} \quad [9]$$

Flow into the compressor $W_c$ may alternatively be expressed by the following relationship.

$$W_c = \frac{W_{air}}{(1 - r_{LP})} \quad [10]$$

At steady state the burned gas fractions at varying points in the system may also be expressed in relation to EGR rates. The burned gas fraction at the exhaust $F_x$, the burned gas fraction at the low pressure EGR mix point $F_{LP,mix}$, and the burned gas fraction at the intake $F_i$ may be represented by the following relationships in a dynamic state.

$$F_{egr,HP}(t) = F_x(t - \tau_{HP}) \quad [11]$$

$$m_i \dot{F}_i = W_{egr,HP} * (F_x(t - \tau_{HP}) - F_i) + W_{itv} * (F_{itv} - F_i) \quad [12]$$

$$F_{egr,LP}(t) = F_x(t-\tau_{LP}) \quad [13]$$

$$m_{LP,mix}\dot{F}_{LP,mix} = W_{egr,LP}*(F_x(t-\tau_{LP})-F_{LP,mix}) - W_{air}F_{LP,mix} \quad [14]$$

The burned fraction at a particular point is generally related to oxygen concentrations, and the relationship between a burned fraction and an oxygen concentration at a particular point may be expressed by the following relationship.

$$O_2 \cong 0.23*(1-F) \quad [15]$$

An exemplary system model for the model based nonlinear control can be expressed by the following nonlinear differential equation.

$$\dot{y} = F(y) + Bu \quad [16]$$

The MIMO feedforward control applied to the inputs u in the exemplary system model expressed above can be expressed by the following equation.

$$u = -B^{-1}F(y) + B^{-1}v \quad [17]$$

The term $-B^{-1}F(y)$ expresses the feedback linearization of the system if y is an actual measured or estimated parameter from the system, or it expresses the feedforward control of the system if y is replaced by its desired reference command to track. The feedback controller v can utilize proportional-integral-derivative (PID), linear quadratic regulator (LQR), or model predictive control (MPC) feedback control methods with minimum gains scheduling required. The multivariable system output vector $\dot{y}$ can be decoupled into a linear SISO feedback system, as is expressed by the following relationship.

$$\dot{y} = \begin{bmatrix} \dot{y}_1 \\ \dot{y}_2 \\ \vdots \\ \dot{y}_n \end{bmatrix} = \begin{bmatrix} v_1 \\ v_2 \\ \vdots \\ v_n \end{bmatrix} = v \quad [18]$$

The input vector u is input into the system model which applies model-based multivariable feedforward control to replace lookup tables, and additionally applies feedback control to improve tracking against unmodeled uncertainties. The output vector $\dot{y}$ is then decoupled into linear SISO feedback vector v.

An exemplary physics based air and charging system model of the exemplary engine configuration, including a low pressure electronic charging system and a high pressure turbo air charging system as is schematically depicted in FIG. 5 is expressed, in accordance with the basic system model equations expressed above, by the following set of equations.

$$\dot{p}_{rc} = -c_2 P_c\left(p_{rc}, \frac{W_c\sqrt{T_{e\_up}}}{p_{e\_up}}\right) + j_c(\dot{W}_c) + c_2 P_t \quad [19]$$

$$\dot{p}_{re} = c_1 T_e - \frac{1}{\omega}c_1 W_c c_p T_a r_e\left(p_{re}, \frac{W_c\sqrt{T_a}}{p_a}\right) + j_e(t) - B\omega \quad [20]$$

$$\begin{bmatrix} \frac{V_i}{RT_i}\dot{p}_i \\ m_i\dot{F}_i \\ m_c\dot{F}_c \end{bmatrix} = \begin{bmatrix} -W_{cyl} \\ 0 \\ 0 \end{bmatrix} + \begin{bmatrix} 1 & 1 & 0 \\ F_c - F_i & F_x - F_i & 0 \\ -F_c & 0 & F_x(t-\tau) \end{bmatrix}\begin{bmatrix} W_{itv} \\ W_{egr,HP} \\ W_{egr,LP} \end{bmatrix} \quad [21]$$

wherein $p_{rc}$ is the compressor pressure ratio of the turbo air charging system,
$p_{re}$ is the compressor pressure ratio of the electric air charging system,
$c_2$ is a calibrated coefficient pertaining to the turbo air charging system,
$c_1$ is a calibrated coefficient pertaining to the electric air charging system,
$P_c$ is compressor power of the turbo air charging system,
$P_t$ is turbine power,
$W_c$ is compressor flow,
$c_p$ is a specific heat constant,
$r_e$ is a compressor power transfer rate for the electric air charging system,
$T_{e\_up}$ is temperature upstream of the compressor of the electric air charging system,
$P_{e\_up}$ is pressure upstream of the compressor of the electric air charging system,
$j_e(t)$ is the inertia term of the compressor of the electric air charging system,
$j_c(\dot{W}_c)$ is the inertia term of the compressor of the turbo air charging system,
B is the damping coefficient of the compressor of the electric air charging system,
ω is motor speed of the electric motor driving the compressor of the electric air charging system,
$V_i$ is the intake volume,
R is the universal gas constant,
$T_a$ is the ambient air temperature,
$P_i$ is the intake pressure,
$m_i$ is the intake mass,
$m_c$ is the air mass before the compressor (at the low pressure EGR mix point),
$F_i$ is the burned gas fraction at the intake,
$F_c$ is the burned gas fraction before the compressor (at the low pressure EGR fix point),
$F_x$ is the burned gas fraction at the exhaust,
t is time, and
τ is a time delay.

Equation 19 is a power balance equation for a high pressure turbo air charging system, such as the turbocharger as depicted in FIG. 5. Equation 20 is a power balance equation for a low pressure electric air charging system, such as the electrically driven compressor as depicted in FIG. 5.

In an alternate embodiment the exemplary engine configuration may include a low pressure turbo air charging system and a high pressure electric air charging system. An exemplary physics based air and charging system model of this configuration is expressed, in accordance with the basic system model equations expressed above, by the following set of equations.

$$\dot{p}_{rc} = -c_1 P_c\left(p_{rc}, \frac{W_c\sqrt{T_a}}{p_a}\right) + J(\dot{W}_c) + c_1 P_t \quad [22]$$

$$\dot{p}_{re} = c_2 T_e - \frac{1}{\omega}c_2 W_c c_p T_{c\_up} r_e\left(p_{re}, \frac{W_c\sqrt{T_{c\_up}}}{p_{c\_up}}\right) + j(t) - B\omega \quad [23]$$

$$\begin{bmatrix} \frac{V_i}{RT_i}\dot{p}_i \\ m_i\dot{F}_i \\ m_c\dot{F}_c \end{bmatrix} = \begin{bmatrix} -W_{cyl} \\ 0 \\ 0 \end{bmatrix} + \begin{bmatrix} 1 & 1 & 0 \\ F_c - F_i & F_x - F_i & 0 \\ -F_c & 0 & F_x(t-\tau) \end{bmatrix}\begin{bmatrix} W_{itv} \\ W_{egr,HP} \\ W_{egr,LP} \end{bmatrix} \quad [24]$$

Equation 22 is a power balance equation for a high pressure turbo air charging system, such as the turbocharger as depicted in FIG. 5. Equation 23 is a power balance equation for a low pressure electric air charging system, such as the electrically driven compressor as depicted in FIG. 5.

Flow through an EGR system can be modeled to estimate the flow based upon a number of known inputs. Flow through the EGR system can be modeled as flow through an orifice, wherein the orifice primarily includes an EGR valve or an orifice or venturi to a particular design. According to one exemplary embodiment, EGR flow, $W_{egr}$, can be modeled according to the following orifice flow equation.

$$W_{egr} = A_{egr} \frac{P_x}{\sqrt{RT_{egr}}} \Psi(PR) \qquad [25]$$

PR is a pressure ratio or ratio of intake pressure or pressure of charged air in the intake system at the outlet of the EGR system, $P_i$, to exhaust pressure or pressure in the exhaust system at the inlet of the EGR system upstream of the charging system, $P_x$. $T_{egr}$ can indicate a temperature of the exhaust gas or exhaust gas temperature at the inlet of the EGR system. According to one exemplary embodiment, $T_{egr}$ can be measured as an exit temperature of the EGR cooler. $A_{egr}$ is the effective flow area of the EGR system. R is the universal gas constant, known in the art. A critical pressure ratio, $PR_c$, can be expressed by the following equation.

$$PR_c = \left(\frac{2}{\gamma+1}\right)^{\frac{\gamma}{\gamma-1}} \qquad [26]$$

γ is a specific heat ratio, known in the art. If PR is greater than $PR_c$, then flow is subsonic. If PR is less than or equal to $PR_c$, then flow is choked. $\Psi(PR)$ is a non-linear function and can be expressed by the following equation.

$$\Psi(PR) = \begin{cases} \sqrt{\frac{2\gamma}{\gamma-1}\left(PR^{\frac{2}{\gamma}} - PR^{(\gamma+1)/\gamma}\right)} & PR_c < PR < 1 \text{(subsonic)} \\ \gamma^{1/2}\left(\frac{2}{\gamma+1}\right)^{\frac{\gamma+1}{2(\gamma-1)}} & PR \leq PR_c \text{(choked)} \end{cases} \qquad [27]$$

$A_{egr}$ can be expressed as a function of EGR valve position, $x_{egr}$. However, based upon detailed modeling and experimental data, including a determination of heat loss through the walls of the system, a more accurate estimation for $A_{egr}$ can be expressed as a function of $x_{egr}$ and PR, which can be expressed by the following equation.

$$A_{egr} = A_{egr}(x_{egr}, PR) \qquad [28]$$

The method disclosed above assumes that the EGR system includes an outlet downstream of the two-stage charging system compressors and an inlet upstream of the charging system turbo unit or turbine of the turbo air charging system turbocharger. It will be appreciated that a different embodiment can be utilized with an EGR system including an outlet upstream of the charging system compressor and an inlet downstream of the charging system turbo unit or turbine or in the exhaust system of a vehicle utilizing a supercharger without a turbine. It will be appreciated that the above equations and the associated inverse flow model can be modified for use with a number of exemplary EGR and charging system configurations, and the disclosure is not intended to be limited to the particular exemplary embodiments disclosed herein.

Figure 6:
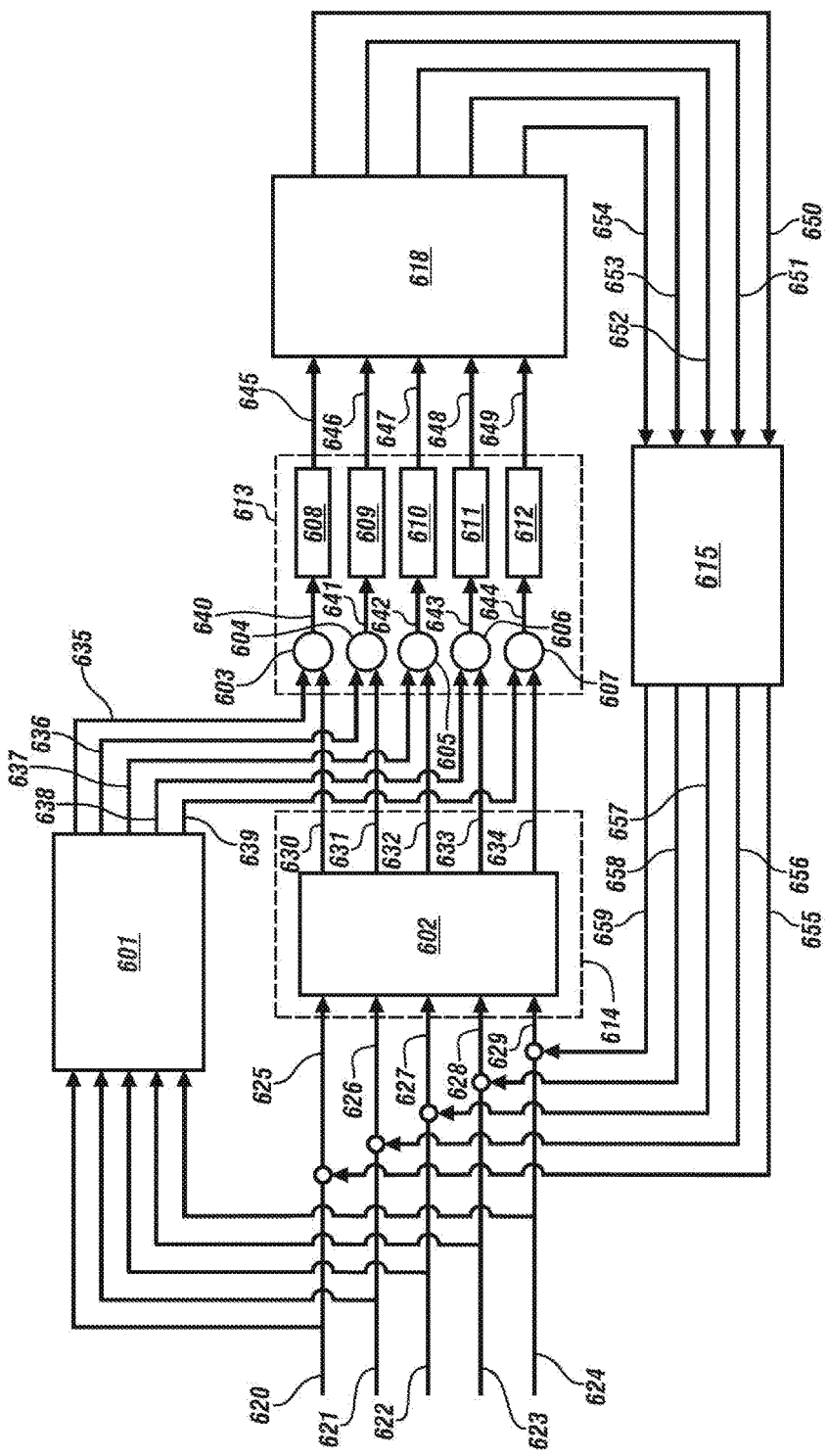
FIG. 6 schematically depicts an exemplary air charging multivariable control system, using model-based feedforward control and feedback control methods, in accordance with the present disclosure.

FIG. 6 schematically depicts an exemplary air charging multivariable control system, using model-based feedforward control and feedback control methods, in accordance with the present disclosure. Air charging system 616 receives commands and produces outputs. A number of modules and control strategies are depicted developing the commands, including the state variable observer module 615, the linear control strategy 614 including feedback control module 602, and the nonlinear control strategy 613. Desired operating parameter points or target operating points may include desired compressor pressure ratio for the compressor of the turbo air charging system $p_{rc\_des}$ 620, desired compressor pressure ratio for the compressor of the electric air charging system $p_{re\_des}$ 621, desired intake manifold pressure $p_{i\_des}$ 622, estimated burned gas fraction at the intake $F_i$ 623, and estimated burned gas fraction before the compressor, at the low pressure EGR fix point, $F_c$ 624. These desired/target points may alternatively be expressed in terms of EGR rates or oxygen concentrations at the desired mix point, as is described by the relationships described herein. The target points may, as exemplary, include any pair of the variables $r_{HP}$, $r_{LP}$, $r_S$, $F_i$, $F_c$, $O_{2,i}$, and $O_{2,c}$ as are described herein. These desired operating parameter points are compared with respective feedback signals 655, 656, 657, 658 and 659 which are determined by either direct sensor measurements or the state variable observer module 615 based on the actual operating parameters of the air charging system 616. These operating parameters are represented by operating parameter signals 650, 651, 652, 653 and 654, and may include, as exemplary, intake manifold pressure, intake manifold temperature, air mass, ambient pressure, and ambient temperature. The air charging system parameters may be monitored by sensors or alternatively estimated by the state variable observer module 615 if no sensor is present. The monitored and estimated system operating parameters may be used to determine feedback signals. The feedback signals describe actual compressor pressure ratio of the turbo air charging system $p_{rc}$ 655, actual compressor pressure ratio of the electric air charging system $p_{re}$ 656, actual intake manifold pressure $p_i$ 657, actual burned gas fraction at the intake $F_i$ 658, and actual burned gas fraction before the compressor, measured at the low pressure EGR fix point, $F_c$ 659. The comparison of the desired operating parameters and the respective actual operating parameters determines error terms for each parameter including a turbo air charging system compressor pressure ratio error term 625, an electric air charging system compressor pressure ratio error term 626, an intake manifold pressure error term 627, a burned gas fraction at the intake error term 628, and a burned gas fraction before the compressor error term 629. These error terms are then input into the feedback control module 602 of the linear control strategy 614. The feedback control method implemented by the feedback control module 602 determines feedback control signals $v_2$ 630, $v_1$ 631, $v_3$ 632, $v_4$ 633 and $v_5$ 634. Desired operating parameter points, including desired turbo air charging system compressor pressure ratio $p_{rc\_des}$ 620, desired electric air charging system compressor pressure ratio $p_{re\_des}$ 621, desired intake manifold pressure $p_{i\_des}$ 622, estimated burned gas fraction at the intake $F_i$ 623, and estimated burned gas fraction before the compressor $F_c$ 624 are additionally input into feedforward control module 601, and feedforward signals including turbo air charging system compressor pressure ratio feedforward signal 635, electric air charging system compressor pressure ratio feedforward signal 636, intake manifold pressure feedforward signal 637, burned gas fraction at the intake feedforward signal 638, and burned gas fraction before the compressor feedforward signal 639 are output. Feedback control signals 630, 631, 632, 633 and 634, as well as feedforward signals 635, 636, 637, 638 and 639 are input into nonlinear control strategy 613. These signals are utilized in calculating electric motor torque 641, turbine power transfer rate $R_t$ 640, air flow $W_{itv}$ 642, HP EGR flow $W_{egrHP}$ 643, and LP EGR flow $W_{egrLP}$ 644 at points 603, 604, 605, 606 and 607. The calculations to determine these signals can be expressed by the following equations:

$$T_e = \left(\frac{1}{\omega} P_{ec} + \frac{v_1}{c_1}\right) \quad [29]$$

$$R_t = \frac{1}{h_t}\left(P_{rc} + \frac{v_2}{c_2}\right) \quad [30]$$

wherein $P_{ec}$ is the power of the compressor of the electrical air boosting system, $P_{rc}$ is the power of the conventional air boosting system, and $h_t$ is the exhaust energy flow.

$$\begin{bmatrix} W_{itv} \\ W_{egr,HP} \end{bmatrix} = \begin{bmatrix} \frac{F_x - F_i}{F_x - F_c} & -\frac{1}{F_x - F_c} \\ \frac{F_i - F_c}{F_x - F_c} & \frac{1}{F_x - F_c} \end{bmatrix} \begin{bmatrix} W_{cyl} + v_2 \\ v_4 \end{bmatrix} \quad [31]$$

$$W_{egr,LP} = r_{LP} W_{itv} + \frac{1}{F_x} v_5 \quad [32]$$

Through the matrix multiplication of equation 31, feedforward module 601, feedback control module 602 and nonlinear control strategy module 613 also have access to information about the engine operation, and operating parameters of the air charging system 616, such as operating parameter signals 650, 651, 652, 653 and 654 which may either be monitored by sensors or alternatively estimated by the state variable observer module 615. Signal 640, which may be either turbine power transfer rate $R_t$, or turbine power $P_t$ as the two are related by $P_t = h_t * R_t$, electric motor torque $T_e$ 641, air flow $W_{itv}$ 642, HP EGR flow $W_{egrHP}$ 643, and LP EGR flow $W_{egrLP}$ 644 are then transformed into system control commands including an electric motor torque command $T_e$ 646, VGT command $u_{vgt}$ 645, an air throttle valve command $u_{itv}$ 647, a HP EGR valve command $u_{egr}$ 648, and a LP EGR valve command 649. The electric motor torque command $T_e$ 646, VGT command $u_{vgt}$ 645, an air throttle valve command $u_{itv}$ 647, a HP EGR valve command $u_{egr}$ 648, and a LP EGR valve command 649 are then used to control the air charging system 616. The transformation of the electric motor torque $T_e$ 641, turbine power transfer rate 640, air flow 642, HP EGR flow 643, and LP EGR flow 644 into the system control commands can be achieved through the use of an inverse flow model or an inverse of a physical model of a system. Such models may include a system model of the electric motor of the electric air charging system 608, an inverse VGT model 609, an inverse intake throttle valve air flow model 610, an inverse high pressure EGR model 611 and an inverse low pressure EGR model 612

An inverse flow model or an inverse of a physical model of a system can be useful in determining settings required to achieve a desired flow through an orifice in the system. Flow through a system can be modeled as a function of a pressure difference across the system and a flow restriction in the system. Known or determinable terms can be substituted and the functional relationship manipulated to make an inverse flow model of the system useful to determine a desired system setting to achieve a desired flow. Exemplary methods disclosed herein utilize a first input of an effective flow area or of a flow restriction for the system being modeled, and a second input including a pressure value for the system of pressure moving the flow through the system. One exemplary method of decoupled feed forward control of an EGR valve can include utilizing an inverse flow model of the system embodied in a mixed polynomial based upon the inverse model and calibrated terms. Another exemplary method of decoupled feed forward control of an EGR valve can include utilizing a dimensional table-based approach. Another exemplary method of decoupled feed forward control of an EGR valve can include utilizing an exponential polyfit model. An exemplary method of decoupled feed forward control of air throttle can utilize an inverse of the physical model of the system, a dimensional table approach, or an exponential polyfit model. An exemplary method of decoupled feed forward control of a charging system, such as a turbocharger equipped with a VGT, can utilize an inverse of the physical model of the system, a dimensional table approach, or an exponential polyfit model.

These methods can be utilized individually or in combination, and different methods can be utilized for the same system for different conditions and operating ranges. A control method can utilize an inverse flow model to determine a feed forward control command for a first selection including one of the EGR circuit, the air throttle system, and the charging system. The control method can additionally utilize a second inverse flow model to determine a second feed forward control command for a second selection including another of the EGR circuit, the air throttle system, and the charging system. The control method can additionally utilize a third inverse flow model to determine a third feed forward control command for a third selection including another of the EGR circuit, the air throttle system, and the charging system. In this way, a control method can control any or all of the EGR circuit, the air throttle system, and the charging system.

A method to control EGR flow by an inverse control method according to an inverse model of EGR flow is disclosed in commonly assigned U.S. Pat. No. 9,297,319, which is incorporated herein by reference.

As indicated related to FIG. 6, feedback control module 602 of linear control strategy 614 determines feedback control signals 630, 631, 632, 633 and 634 using feedback control methods. The exemplary feedback control methods used by the feedback control module of FIG. 6 can include PID control. In an exemplary embodiment, the PID control module can be designed as multiple individual modules each assigned to a particular desired operating parameter input in order to output decoupled feedback control signals. The feedback control module may alternatively utilize model predictive control or linear quadratic regulator control methods.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An apparatus for controlling a two-stage air boosting system of an internal combustion engine with mixed exhaust gas recirculation, said apparatus comprising:
   an air throttle system comprising a throttle valve and an intake manifold;
   a first air charging system within a low pressure (LP) exhaust gas recirculation (EGR) loop comprising one of an electrical air charging system including a respective compressor driven by an electric motor and a turbo air charging system including a respective compressor driven by an exhaust turbine;
   a second air charging system within a high pressure (HP) exhaust gas recirculation (EGR) loop comprising the other of the electrical air boosting system and the turbocharger air boosting system;
   a MIMO control module executing a multivariable control comprising:
   a respective target operating point (620, 621, 622, 623, 624) for each of the turbo air charging system, the electrical air charging system, the air throttle system, the HP EGR loop, and the LP EGR loop;
   a respective feedback signal (655, 656, 657, 658, 659) for each of the turbo air charging system, the electrical air charging system, the air throttle system, the HP EGR loop, and the LP EGR loop;
   a model-based feedforward control module (601) comprising as inputs said target operating points (620, 621, 622, 623, 624), and comprising as outputs corresponding feedforward signals (635, 636, 637, 638, 639) for the turbo air charging system, the electrical air charging system, the air throttle system, the HP EGR loop, and the LP EGR loop;
   a feedback control module (602) comprising as inputs respective error terms (625, 626, 627, 628, 629) for each of the turbo air charging system, the electrical air charging system, the air throttle system, the HP EGR loop, and the LP EGR loop, said error terms determined by comparing said target operating points (620, 621, 622, 623, 624) to corresponding feedback signals (655, 656, 657, 658, 659), and comprising as outputs corresponding feedback control signals (630, 631, 632, 633,634) for the turbo air charging system, the electrical air charging system, the air throttle system, the HP EGR loop, and the LP EGR loop; and
   a non-linear control strategy module (613) comprising as inputs respective feedforward signals (635, 636, 637, 638, 639) and feedback control signals (630, 631, 632, 633,634), and comprising as outputs corresponding control commands (645, 646,647,648,649) for each of the turbo air charging system, the electrical air charging system, the air throttle system, the HP EGR loop, and the LP EGR loop.

2. The apparatus of claim 1, wherein the first air charging system is an electric air charging system and the second air charging system is a turbo air charging system.

3. The apparatus of claim 1, wherein the first air charging system is a turbo air charging system and the second air charging system is an electric air charging system.

4. The apparatus of claim 1, wherein the respective target operating point for the turbo air charging system comprises a respective compressor pressure ratio for the exhaust turbine driven compressor, the respective target operating point for the electrical air charging system comprises a respective compressor pressure ratio for the electric motor driven compressor, the respective target operating point for the air throttle system comprises an intake manifold pressure, the respective target operating point for the HP EGR loop comprises a respective burned gas fraction at the intake manifold, and the respective target operating point for the low pressure exhaust gas recirculation loop comprises a respective burned gas fraction before the respective one of the electric motor driven compressor and the exhaust turbine driven compressor associated with the first air charging system.

5. The apparatus of claim 1, wherein the respective target operating point for the turbo air charging system comprises a respective compressor pressure ratio for the exhaust turbine driven compressor, and the respective target operating point for the electrical air charging system comprises a respective compressor pressure ratio for the electric motor driven compressor.

6. The apparatus of claim 1, wherein the respective target operating point for the HP EGR loop comprises a respective burned gas fraction at the intake manifold, and the respective target operating point for the LP EGR loop comprises a respective burned gas fraction before the respective one of the electric motor driven compressor and the exhaust turbine driven compressor associated with the first air charging system.

7. The apparatus of claim 1, wherein the non-linear control strategy module (613) calculates a torque ($T_e$) of the electric motor, a turbine power transfer rate ($R_t$) for the exhaust turbine, an air flow ($W_{itv}$) through the throttle valve, an EGR flow ($W_{egr,HP}$) through the HP EGR loop, and an EGR flow ($W_{egr,LP}$) through the LP EGR loop in accordance with the following relationships:

$$T_e = \left(\frac{1}{\omega} P_{ec} + \frac{v_1}{c_1}\right)$$

wherein $\omega$ is a speed of the electric motor,
$P_{ec}$ is a power of the compressor of the electrical air charging system,
$v_1$ is the feedback control signal (631) for the electrical air charging system, and
$c_1$ is a calibrated coefficient pertaining to the electric air charging system;

$$R_t = \frac{1}{h_t}\left(P_{rc} + \frac{v_2}{c_2}\right)$$

wherein $h_t$ is an exhaust energy flow,
$P_{rc}$ is a power of the turbo air charging system,
$v_2$ is the feedback control signal (630) for the turbo air charging system, and
$c_2$ is a calibrated coefficient pertaining to the turbo air charging system;

$$\begin{bmatrix} W_{itv} \\ W_{egr,HP} \end{bmatrix} = \begin{bmatrix} \frac{F_x - F_i}{F_x - F_c} & -\frac{1}{F_x - F_c} \\ \frac{F_i - F_c}{F_x - F_c} & \frac{1}{F_x - F_c} \end{bmatrix} \begin{bmatrix} W_{cyl} + v_3 \\ v_4 \end{bmatrix}$$

wherein $F_x$ is a burned gas fraction at the exhaust,
$F_i$ is a burned gas fraction at the intake manifold,
$F_c$ is a burned gas fraction before the respective one of the electric motor driven compressor and the exhaust turbine driven compressor associated with the first air charging system, $W_{cyl}$ is a cylinder charge flow, $v_3$ is the feedback control signal (632) for the air throttle system, and $v_4$ is the feedback control signal (633) for the HP EGR loop, and $$\begin{bmatrix} W_{itv} \\ W_{egr,HP} \end{bmatrix} = \begin{bmatrix} \dfrac{F_x - F_i}{F_x - F_c} & -\dfrac{1}{F_x - F_c} \\ \dfrac{F_i - F_c}{F_x - F_c} & \dfrac{1}{F_x - F_c} \end{bmatrix} \begin{bmatrix} W_{cyl} + v_3 \\ v_4 \end{bmatrix}$$

wherein $r_{LP}$ is an EGR rate through the LP EGR loop, $F_x$ is the burned gas fraction at the exhaust, and $v_5$ is the feedback control signal (634) for the LP EGR loop.

8. The apparatus of claim 1, further comprising a state variable observer module estimating said feedback signals (655, 656, 657, 658, 659).

9. An apparatus for controlling a two-stage air boosting system of an internal combustion engine with mixed exhaust gas recirculation, said apparatus comprising:

an air throttle system comprising a throttle valve and an intake manifold;

an electrical air charging system including a respective compressor driven by an electric motor within a low pressure (LP) exhaust gas recirculation (EGR) loop;

a turbo air charging system including a respective compressor driven by an exhaust turbine within a high pressure (HP) exhaust gas recirculation (EGR) loop;

a MIMO control module executing a multivariable control comprising:

a respective target operating point (620, 621, 622, 623, 624) for each of the turbo air charging system, the electrical air charging system, the air throttle system, the HP EGR loop, and the LP EGR loop;

a respective feedback signal (655, 656, 657, 658, 659) for each of the turbo air charging system, the electrical air charging system, the air throttle system, the HP EGR loop, and the LP EGR loop;

a model-based feedforward control module (601) comprising as inputs said target operating points (620, 621, 622, 623, 624), and comprising as outputs corresponding feedforward signals (635, 636, 637, 638, 639) for the turbo air charging system, the electrical air charging system, the air throttle system, the HP EGR loop, and the LP EGR loop;

a feedback control module (602) comprising as inputs respective error terms (625, 626, 627, 628, 629) for each of the turbo air charging system, the electrical air charging system, the air throttle system, the HP EGR loop, and the LP EGR loop, said error terms determined by comparing said target operating points (620, 621, 622, 623, 624) to corresponding feedback signals (655, 656, 657, 658, 659), and comprising as outputs corresponding feedback control signals (630, 631, 632, 633,634) for the turbo air charging system, the electrical air charging system, the air throttle system, the HP EGR loop, and the LP EGR loop; and a non-linear control strategy module (613) comprising as inputs respective feedforward signals (635, 636, 637, 638, 639) and feedback control signals (630, 631, 632, 633,634), and comprising as outputs corresponding control commands (645, 646,647,648,649) for each of the turbo air charging system, the electrical air charging system, the air throttle system, the HP EGR loop, and the LP EGR loop.

10. An apparatus for controlling a two-stage air boosting system of an internal combustion engine with mixed exhaust gas recirculation, said apparatus comprising:

an air throttle system comprising a throttle valve and an intake manifold;

a turbo air charging system including a respective compressor driven by an exhaust turbine within a low pressure (LP) exhaust gas recirculation (EGR) loop;

an electrical air charging system including a respective compressor driven by an electric motor within a high pressure (HP) exhaust gas recirculation (EGR) loop;

a MIMO control module executing a multivariable control comprising:

a respective target operating point (620, 621, 622, 623, 624) for each of the turbo air charging system, the electrical air charging system, the air throttle system, the HP EGR loop, and the LP EGR loop;

a respective feedback signal (655, 656, 657, 658, 659) for each of the turbo air charging system, the electrical air charging system, the air throttle system, the HP EGR loop, and the LP EGR loop;

a model-based feedforward control module (601) comprising as inputs said target operating points (620, 621, 622, 623, 624), and comprising as outputs corresponding feedforward signals (635, 636, 637, 638, 639) for the turbo air charging system, the electrical air charging system, the air throttle system, the HP EGR loop, and the LP EGR loop;

a feedback control module (602) comprising as inputs respective error terms (625, 626, 627, 628, 629) for each of the turbo air charging system, the electrical air charging system, the air throttle system, the HP EGR loop, and the LP EGR loop, said error terms determined by comparing said target operating points (620, 621, 622, 623, 624) to corresponding feedback signals (655, 656, 657, 658, 659), and comprising as outputs corresponding feedback control signals (630, 631, 632, 633,634) for the turbo air charging system, the electrical air charging system, the air throttle system, the HP EGR loop, and the LP EGR loop; and a non-linear control strategy module (613) comprising as inputs respective feedforward signals (635, 636, 637, 638, 639) and feedback control signals (630, 631, 632, 633,634), and comprising as outputs corresponding control commands (645, 646,647,648,649) for each of the turbo air charging system, the electrical air charging system, the air throttle system, the HP EGR loop, and the LP EGR loop.

* * * * *